US012793054B2

(12) United States Patent
Herlihy et al.

(10) Patent No.: US 12,793,054 B2
(45) Date of Patent: Nov. 10, 2026

(54) ACCOUNTABILITY AND TRUST IN DISTRIBUTED LEDGER SYSTEMS

(71) Applicant: Oracle International Corporation, Redwood City, CA (US)

(72) Inventors: Maurice P. Herlihy, Brookline, MA (US); Mark S. Moir, Wellington (NZ)

(73) Assignee: Oracle International Corporation, Redwood City, CA (US)

( * ) Notice: Subject to any disclaimer, the term of this patent is extended or adjusted under 35 U.S.C. 154(b) by 941 days.

(21) Appl. No.: 15/169,622

(22) Filed: May 31, 2016

(65) Prior Publication Data

US 2017/0236120 A1 Aug. 17, 2017

Related U.S. Application Data

(60) Provisional application No. 62/294,167, filed on Feb. 11, 2016.

(51) Int. Cl.
*G06F 21/57* (2013.01)
*G06F 21/60* (2013.01)
(Continued)

(52) U.S. Cl.
CPC ......... *G06Q 20/3827* (2013.01); *G06F 21/57* (2013.01); *G06F 21/602* (2013.01); (Continued)

(58) Field of Classification Search
CPC ... H04L 9/3239; H04L 9/3236; G06F 21/606; G06Q 20/3825; G06Q 20/3827
See application file for complete search history.

(56) References Cited

U.S. PATENT DOCUMENTS 6,671,821 B1 12/2003 Castro et al.
8,230,253 B2 7/2012 Butterworth
(Continued)

FOREIGN PATENT DOCUMENTS

CA 3010118 A1 * 7/2017 ........... G06Q 20/223
CN 104217362 12/2014
(Continued)

OTHER PUBLICATIONS

An Efficient and Scalable Quasi-Aggregate Signature Scheme Based on LFSR Sequences by Saikat Chakrabarti, Santosh Chandrasekhar, Mukesh Singhal, Fellow, IEEE, and Kenneth L. Calvert (Year: 2009).*
(Continued)

*Primary Examiner* — Ilse I Immanuel
(74) *Attorney, Agent, or Firm* — Robert C. Kowert; Kowert, Hood, Munyon, Rankin & Goetzel, P.C.

(57) ABSTRACT

Distributed ledger systems that provide enhanced accountability and trust are described. A sender node may send messages to a receiver node. The sender node may compute a value (e.g., a hash) based on the sent messages and at least one previously sent message. The sender node may receive a confirmation message for the messages from the receiver node including a value computed by the receiver node based on the messages and at least one previously received message. The sender node may compare the computed value to the value included in the confirmation message to determine that the receiver node has or has not received a correct sequence of messages. The confirmation message may also include a summary of local data of the receiver node that indicates to the sender node that the receiver node has or has not processed all messages received.

16 Claims, 7 Drawing Sheets

(51) Int. Cl.

| | |
|---|---|
| ***G06Q 20/06*** | (2012.01) |
| ***G06Q 20/38*** | (2012.01) |
| ***H04L 9/32*** | (2006.01) |
| *H04L 9/00* | (2022.01) |

(52) U.S. Cl.

CPC ....... *G06Q 20/065* (2013.01); *G06Q 20/3821* (2013.01); *H04L 9/3236* (2013.01); *G06F 2221/2101* (2013.01); *G06Q 2220/00* (2013.01); *H04L 9/50* (2022.05)

(56) References Cited

U.S. PATENT DOCUMENTS

| | | | | |
|---|---|---|---|---|
| 9,171,044 | B2 | 10/2015 | Schleimer | |
| 9,667,720 | B1 | 5/2017 | Bent et al. | |
| 9,811,546 | B1 | 11/2017 | Bent et al. | |
| 10,009,044 | B1 | 6/2018 | Lazier | |
| 10,102,265 | B1 | 10/2018 | Madisetti et al. | |
| 10,291,707 | B1 | 5/2019 | Lin et al. | |
| 10,740,733 | B2 | 8/2020 | Moir et al. | |
| 11,538,003 | B2 | 12/2022 | Moir et al. | |
| 2003/0055903 | A1* | 3/2003 | Freed | H04L 51/12 709/206 |
| 2005/0038801 | A1 | 2/2005 | Colrain et al. | |
| 2011/0282832 | A1 | 11/2011 | Rishel et al. | |
| 2012/0254175 | A1 | 10/2012 | Horowitz et al. | |
| 2012/0324472 | A1 | 12/2012 | Rossbach et al. | |
| 2013/0073436 | A1 | 3/2013 | Luk et al. | |
| 2013/0290249 | A1 | 10/2013 | Merriman | |
| 2013/0311441 | A1 | 11/2013 | Erdogan et al. | |
| 2014/0108421 | A1 | 4/2014 | Isaacson | |
| 2014/0122510 | A1 | 5/2014 | Namkoong et al. | |
| 2014/0136617 | A1* | 5/2014 | Singer | H04L 51/52 709/204 |
| 2015/0103383 | A1* | 4/2015 | Dowling | H04N 1/00225 358/402 |
| 2015/0227521 | A1 | 8/2015 | Levari et al. | |
| 2015/0254325 | A1 | 9/2015 | Stringham | |
| 2015/0341422 | A1* | 11/2015 | Färnlöf | H04L 67/10 709/202 |
| 2016/0191509 | A1 | 6/2016 | Bestler et al. | |
| 2016/0321751 | A1 | 11/2016 | Creighton, IV et al. | |
| 2016/0335310 | A1 | 11/2016 | Lahiri et al. | |
| 2016/0344550 | A1* | 11/2016 | Anton | H04L 9/3236 |
| 2017/0032010 | A1 | 2/2017 | Merriman | |
| 2017/0046792 | A1* | 2/2017 | Haldenby | G06Q 20/0655 |
| 2017/0048216 | A1 | 2/2017 | Chow | |
| 2017/0054611 | A1† | 2/2017 | Tiell | |
| 2017/0075941 | A1 | 3/2017 | Finlow-Bates | |
| 2017/0124556 | A1* | 5/2017 | Seger, II | H04L 67/20 |
| 2017/0132625 | A1* | 5/2017 | Kennedy | G06Q 20/065 |
| 2017/0140375 | A1 | 5/2017 | Kunstel | |
| 2017/0230189 | A1† | 8/2017 | Toll et al. | |
| 2017/0278186 | A1 | 9/2017 | Creighton, IV et al. | |
| 2017/0337534 | A1 | 11/2017 | Goeringer et al. | |
| 2017/0359374 | A1* | 12/2017 | Smith | H04L 9/3236 |
| 2018/0068130 | A1 | 3/2018 | Chan et al. | |
| 2022/0284129 | A1 | 9/2022 | Buldas | |
| 2023/0089896 | A1 | 3/2023 | Moir et al. | |
| 2023/0342774 | A1 | 10/2023 | Buldas | |
| 2024/0265358 | A1 | 8/2024 | Moir et al. | |

FOREIGN PATENT DOCUMENTS

| | | |
|---|---|---|
| CN | 104951935 | 9/2015 |
| CN | 105488665 | 4/2016 |
| CN | 106302720 | 1/2017 |
| WO | 2016046820 | 3/2016 |

OTHER PUBLICATIONS

Service Oriented Sharding for Blockchain, Cornel University , pp. 1-9, Adam, Gencer et al.*

Marcio; An efficient fault-tolerance technique for the Keyed-Hash Message Authentication Code; 2010 IEEE Aerospace Conference, 2010, p. 1-17.*

Arhag, "Addressing Nothing-at-Stake concerns in POS consensus systems", Retrieved from URL: https://bitsharestalk.org/index.php?action=printpage; topic=6638.0 on May 31, 2016, Posted on Aug. 4, 2014, pp. 1-13.

Gilles Brassard, et al., "Minimum Disclosure Proofs of Knowledge", Journal of Computer and System Sciences 37, 1988, pp. 156-189.

Miguel Castro, "Practical Byzantine Fault Tolerance", In Proceedings of the Third Symposium on Operating Systems Design and Implementation, OSDI '99, 1999, pp. 173-186.

Nicolas T. Courtois, et al., "On Subversive Miner Strategies and Block Withholding Attack in Bitcoin Digital Currency", arXiv preprint arXiv:1402.1718, 2014, pp. 1-15.

Paul Snow, et al., "Business Processes Secured by Immutable Audit Trails on the Blockchain", Retrieved from https://github.com/FactomProject/FactomDocs/blob/master/Factom_Whitepaper.pdf., Nov. 17, 2014, pp. 1-38.

M. Hearn, "The resolution of the bitcoin experiment", Retrieved from URL: https://medium.com/@octskyward/the-resolution-of-the-bitcoin-experiment-dabb30201f7# a55y4fshb on May 31, 2016, pp. 1-16.

Ahmed Kosba, et al., "Hawk: The Blockchain Model of Cryptography and Privacy-Preserving Smart Contracts", 2015, pp. 1-31, University of Maryland and Cornell University.

Satoshi Nakamoto, "Bitcoin: A Peer-to-Peer Electronic Cash System", www.cryptovest.co.uk, Oct. 31, 2008, pp. 1-9.

Jae Kwon, "Tendermint: Consensus without Mining", URL http://tendermint. com/docs/tendermint { } v04. pdf, 2014, pp. 1-11.

Baruch Awerbuch, et al., "Robust Random Number Generation for Peer-to-Peer Systems," Part of the Lecture Notes in Computer Science book series (LNCS, vol. 4305), 2006, pp. 1-15.

Jörg Becker, et al, "Can we Afford Integrity by Proof-of-Work?," ERCIS, pp. 1-28.

Christopher Copeland and Hongxia Zhong. "Tangaroa: a byzantine fault tolerant raft." http://www.scs.stanford.edu/14au-cs244b/labs/projects/copeland_zhong.pdf, 2016, pp. 1-5.

Cormen, et al., "Introductions to Algorithms," Third Edition, the MIT Press, 2009, pp. 1-1313.

Ittay Eyal, et al, "Bitcoin-NG: A Scalable Blockchain Protocol," This paper is included in the Proceedings of the 13th USENIX Symposium on Networked Systems Design and Implementation (NSDI '16), Mar. 16-18, 2016, pp. 1-16.

Eleftherios Kokoris Kogias, et al, "Enhancing Bitcoin Security and Performance with Strong Consistency via Collective Signing," This paper is included in the Proceedings of the 25th USENIX Security Symposium Aug. 10-12, 2016, Austin, TX, pp. 1-19.

Ralph C. Merkle, "A Digital Signature Based on a Conventional Encryption Function," 1998 Springer-Verlag, pp. 1-10.

Satoshi Nakamoto, "Bitcoin: A Peer-to-Peer Electronic Cash System," 2008, pp. 1-9.

Miguel Castro, et al., "Practical Byzantine Fault Tolerance," Appears in the Proceedings of the Third Symposium on Operating Systems Design and Implementation, New Orleans, USA, Feb. 1999, pp. 1-14.

Loi Luu, et al., "A Secure Sharding Protocol for Open Blockchains," 2016 Copyright held by the owner/author(s). Publication rights licensed to ACM, pp. 1-14.

Diego Ongaro, et al., "In Search of an Understandable Consensus Algorithm," This paper is included in the Proceedings of USENIX ATC '14: 2014 USENIX Annual Technical Conference, Jun. 19-20, 2014, pp. 1-16.

Gencer, Adam et al., "Short Paper: Service-Oriented Sharding for Blockchains", Cornell University (Apr. 2017), https://www.researchgate.net/publication/322000850_Short_Paper_Service-Oriented_Sharding_for_Blockchains (Year: 2017), pp. 1-18.

Wenting Li et al, "Towards Scalable and Private Industrial Blockchains", Proceedings of the ACM workshop onblockchain, Cryptocurrencies and Contracts, dated Apr. 2, 2017, pp. 9-14.

Kyle Croman et al, "On Scaling Decentralized Blockchains", dated Aug. 31, 2016, Medical Image computing andcomputer-assisted

(56) References Cited

OTHER PUBLICATIONS intervention—Miccai 2015: 18th International Conference, Munich, Germany, Oct. 5-9, 2015, Proceedings; (Lecure Notes in Computer Science;Lect.Notes Computer) Springer International Publishing, CH, pp. 1-20.
Tien Tuan Anh Dinh, et al., "Blockbench: A Framework for Analyzing Private Bockchains", arviXiv:1703.04057v1, Mar. 12, 2017, pp. 1-16.
Creighton, Rhett, "Domus Tower Blockchain (Draft)", from https://pdfs.semanticscholar.org/559c/38d908521cd0772aa070619bf93a706c011e.pdf, Mar. 28, 2016, (Year: 2016).
"SharPer: Sharding Permissioned Blockchains Over Network Clusters," Amiri, et al., Reasearch Data Management Track Paper, SIGMOD 2021, pp. 76-88.
George Danezis et al: "Centrally Banked Cryptocurrencies", IACR, International Association for Cryptologic Research, Dec. 18, 2015, pp. 1-14, vol. 20151218:092419.
Eleftherios Kokoris-Kogias et al: "OmniLedger: A Secure, Scale-Out, Decentralized Ledger", IACR, International Association for Cryptologic Research, May 11, 2017, pp. 1-17, vol. 20171010:135000, Retrieved from the Internet: URL:http://eprint.iacr.org/2017/406.pdf [retrieved on May 11, 2017].
Daisuke Yamasaki, Advanced Edition of Blockchain Technology Commentary, Advanced Technologies for the Next Generation "IOTA", "IPFS", and "Cosmos" are understood in this one book, Blockchain & Bitcoin, Nikkei BP, Toshiyuki Sugiyama, Masakazu Terayama, Dec. 24, 2016, pp. 111 to 113, English abstract.
U.S. Appl. No. 19/088,440, filed Mar. 24, 2025, Mark S. Moir, et al.

* cited by examiner
† cited by third party

ACCOUNTABILITY AND TRUST IN DISTRIBUTED LEDGER SYSTEMS

PRIORITY INFORMATION

This application claims benefit of priority of U.S. Provisional Application Ser. No. 62/294,167 entitled "Enhanced Accountability and Trust in Distributed Ledger Systems" filed Feb. 11, 2016, the content of which is incorporated by reference herein in its entirety.

BACKGROUND

Field of the Disclosure

This disclosure relates generally to distributed ledgers, and more particularly to systems and methods for providing enhanced accountability and trust in distributed ledgers.

Description of the Related Art

A distributed ledger may be broadly defined as a digital record of asset ownership. There is no central administrator of the ledger, nor is there a central data store. Instead, the ledger is replicated across many participating nodes in a peer-to-peer environment that may be geographically spread across multiple sites, countries, or institutions. A consensus protocol ensures that each node's copy of the ledger is identical to every other node's copy; the set of copies may be viewed as a single shared ledger. Asset owners use cryptographic signature technology to debit their account and credit another's account.

Permissionless decentralized ledgers ("blockchains") such as the one underlying the cryptocurrency Bitcoin allow anonymous participants to maintain the ledger, while avoiding control or "censorship" by any single entity. In contrast, permissioned decentralized ledgers exploit real-world trust and accountability, allowing only explicitly authorized parties to maintain the ledger. Permissioned ledgers support more flexible governance and a wider choice of consensus mechanisms.

Both kinds of decentralized ledgers may be susceptible to manipulation by participants who favor some transactions over others. The real-world accountability underlying permissioned ledgers provides an opportunity to impose fairness constraints that can be enforced by penalizing violators after-the-fact. To date, however, this opportunity has not been fully exploited, unnecessarily leaving participants latitude to manipulate outcomes undetectably.

SUMMARY

Methods and apparatus for providing enhanced accountability and trust in distributed ledger systems are described. In a distributed ledger system, a plurality of computing devices may be configured to participate as a plurality of nodes in a distributed ledger. Each node locally stores and maintains a copy of the ledger, and each node sends messages including ledger information to and receives messages including ledger information from others of the nodes via a network.

In some embodiments, a sender node may send one or more messages to another node acting as a receiver node. The sender node may compute a value (e.g., a hash) based on the one or more sent messages and at least one previously sent message. The sender node may receive a confirmation message for the one or more sent messages from the receiver node, the confirmation message including a value computed by the receiver node based on the one or more messages and at least one previously received message. The sender node may compare the computed value to the value included in the confirmation message to determine that the receiver node has or has not received a correct sequence of messages. In some embodiments, the confirmation message further includes a summary of local data of the receiver node that indicates to the sender node that the receiver node has or has not processed all messages received. In some embodiments, the messages are indexed, and the sender node includes, in each message sent to the receiver node, an indication of a highest index of messages for which the sender node has received confirmation from the receiver node. In some embodiments, the receiver node records a highest index for messages that it has confirmed to the sender node for comparison to the highest indexes received in the messages from the sender node to determine out of sequence confirmations or invalid confirmations. In some embodiments, the sender node includes, in each message sent to the receiver node, an index for a last message sent to the receiver node from the sender node, and the receiver node records an index for messages that it has previously received from the sender node for comparison to the indexes for last messages received in the messages from the sender node.

In some embodiments, a receiver node may receive one or more messages from another node acting as a sender node. The receiver node may compute a value based on the one or more received messages and at least one previously received message. In some embodiments, to compute the value, the receiver node concatenates the one or more messages to a previously computed hash of the at least one previously received message and computes a hash of results of the concatenation. The receiver node may return a confirmation message for the one or more received messages to the sender node, the confirmation message including the computed value. The computed value indicates to the sender node that the receiver node has or has not received a correct sequence of messages. In some embodiments, the receiver node includes a summary of its local data in the confirmation message that indicates to the sender node that the receiver node has or has not processed all messages received. In some embodiments, the messages are indexed, and each message received from the sender node includes an indication of a highest index of messages for which the sender node has received confirmation from the receiver node. The receiver node records a highest index for messages that it has confirmed to the sender node for comparison to the highest indexes received in the messages from the sender node.

Figure 1:
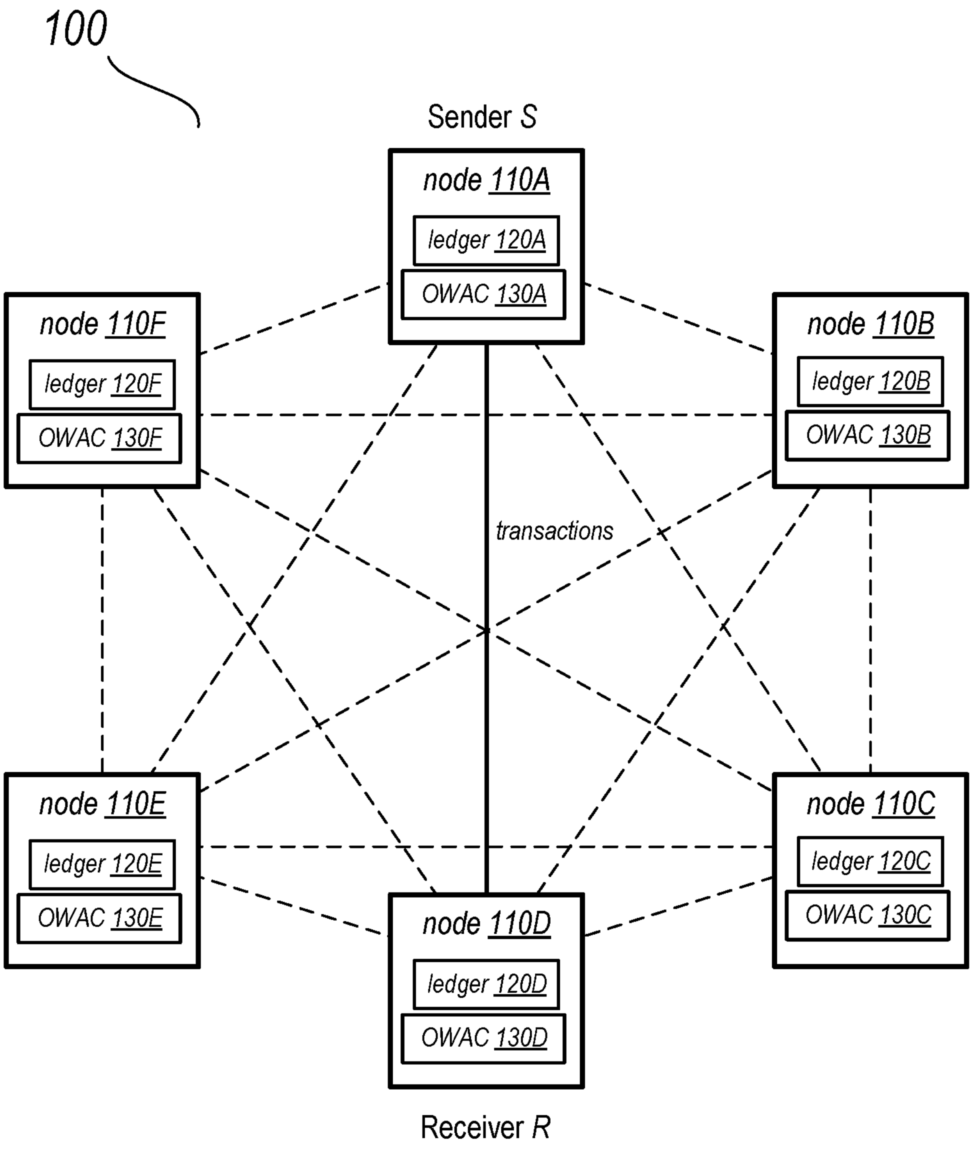
FIG. 1 illustrates a distributed ledger system that implements a one-way accountable channel mechanism (OWAC), according to some embodiments.

While the disclosure is described herein by way of example for several embodiments and illustrative drawings, those skilled in the art will recognize that the disclosure is not limited to embodiments or drawings described. It should be understood that the drawings and detailed description hereto are not intended to limit the disclosure to the particular form disclosed, but on the contrary, the disclosure is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

Methods and apparatus for providing enhanced accountability and trust in distributed ledger systems are described. Principles for designing permissioned decentralized ledgers that hold participants accountable for fairness policy violations are described, and embodiments of an enhanced decentralized ledger system that implement these principles are described.

The value proposition of decentralized ledgers (e.g., "blockchains") is trustworthy processing of transactions without the need to fully trust any individual or entity, thereby reducing cost and latency of processes that require trusted intermediaries, as well as enabling use cases for which such trusted intermediaries cannot be found or impose excessive overhead or cost. Allowing only known, authorized entities to participate in maintaining a ledger allows for faster and more efficient implementations than "permisionless" ledgers allow, in part because of trust relationships and accountability of the authorized participants. However, existing implementations of decentralized ledgers may allow participants significant latitude to influence transaction outcomes, for example via exclusion or reordering. Embodiments of an enhanced decentralized ledger system as described herein may implement techniques and methods as described herein that address this issue to increase or maximize trust and accountability in decentralized ledgers.

As previously noted, the real-world accountability underlying permissioned ledgers provides an opportunity to impose fairness constraints that can be enforced by penalizing violators after-the-fact. To date, however, this opportunity has not been fully exploited, unnecessarily leaving participants latitude to manipulate outcomes undetectably. Embodiments of methods and apparatus for providing enhanced accountability and trust in distributed ledger systems are described that implement mechanisms according to design principles that make such manipulation more difficult, as well as mechanisms to make it easier to detect when violations occur.

A blockchain is a data structure used to implement tamper-resistant distributed ledgers. Multiple nodes follow a common protocol in which transactions from clients are packaged into blocks, and nodes use a consensus protocol to agree on the next block. Blocks carry cumulative cryptographic hashes making it difficult to tamper with the ledger. Bitcoin is a non-limiting example of a blockchain-based distributed ledger.

In permissionless implementations, such as Bitcoin, any node willing to follow the protocol can participate, and any client can create accounts and propose transactions. By contrast, in permissioned implementations, the sets of participating nodes are controlled by an authority, for example an organization or consortium.

A permissionless implementation makes sense for applications such as Bitcoin which seek to ensure that no entity can control who can participate, a property often called censorship resistance. By contrast, permissioned implementations explicitly permit some forms of censorship: for example, permitting compliance with "know your customer" regulations that exclude known money-launderers from financial markets. Moreover, permissioned implementations can often provide more effective governance, for example by providing an orderly procedure for updating the ledger protocol.

Another important difference between permissionless and permissioned ledgers is that permissioned ledgers can hold participants accountable for misbehavior in ways that permissionless implementations cannot. Many distributed ledgers may benefit from fairness guarantees. For example, one client's proposed transactions should not be systematically delayed longer than other clients' transactions, or one client's transactions should not be systematically scheduled just after another client's competing transaction (e.g., front-running a stock purchase). While it may be difficult or impossible to flag a single instance of a fairness violation, systematic violations can be detected over time with high confidence. A fairness policy is a technique for ensuring a fairness guarantee.

In permissionless ledgers, such as Bitcoin, an inherent lack of accountability makes fairness policies difficult to enforce. For example, in a mining cartel attack, a group of Bitcoin miners ignores transactions proposed by miners who are not members of that group. It can be difficult to detect such behavior, and even if detected, the cartel members generally suffer no effective penalty, other than perhaps public shaming and a loss of confidence in the ledger itself.

Even in permissioned ledgers, however, a participating node may violate a fairness policy, for example because it has been hacked, its software is defective, or its operator is dishonest. In principle, permissioned ledgers make it easier to hold nodes accountable for fairness policy violations: once exposed, a violator may lose a deposit, may be expelled from the ledger, or may be sued. In practice, however, reducing the opportunities for internal fairness violations, and detecting them when they occur, is a non-trivial problem.

Principles for designing permissioned decentralized ledgers that hold participants accountable for fairness policy violations are described, and embodiments of decentralized ledger systems that implement these principles are also described. To demonstrate that these principles apply to real systems, a number of modifications to the open-source "Tendermint" ledger system are described. Tendermint provides an effective platform for illustrating the principles described herein, but these principles are applicable to a wide range of ledger implementations. The general principles, specific techniques, and embodiments of decentralized ledger systems that implement these principles and techniques as described herein may be effective in ensuring fairness properties in distributed ledgers.

Embodiments of permissioned decentralized ledgers as described herein may be based on the following principles.

Each non-deterministic choice presents an opportunity to manipulate outcomes. As much as possible, non-deterministic choices should be replaced with deterministic rules, and mechanisms for detecting violations and holding the violators accountable should be available.

Non-deterministic choices that cannot be avoided should be disclosed in an auditable way, ensuring that they cannot be altered later and that unusual statistical patterns can be detected.

As much as possible, mechanisms that enhance accountability should be kept off the system's critical path in order to avoid imposing substantial costs on normal-case execution by participants.

In some cases, participants can be held accountable right away; for example, posting a proof that a participant cheated may cause that participant to be expelled. However, often participants can be held accountable only after-the-fact. For example, in some cases it may be detected that one of two interacting parties cheated, but it may not be immediately clear which one. Further, in some cases, individual violations may be indistinguishable from legitimate non-determinism. In both cases, reducing opportunities for non-deterministic choices and systematically logging remaining ones can reveal suspicious long-term trends.

The following section (Example distributed ledger system) presents a brief description of relevant aspects of Tendermint, an example open-source distributed ledger system in which embodiments may be implemented. The section titled Enhanced Distributed Ledger System—Overview provides an overview of the design of embodiments of an enhanced distributed ledger system. Details of the enhanced distributed ledger system, including a one-way accountable channel mechanism (OWAC) that may provide a building block for accountable one-way communication from one node to another, are presented in the section titled Enhanced Distributed Ledger System—Details. Further discussion of embodiments is provided in the section titled Enhanced Distributed Ledger System—Further Discussion, and example pseudocode for OWAC is provided in the section titled Example pseudocode for OWAC.

Example Distributed Ledger System

Tendermint is provided as an example of an open-source distributed ledger system in which embodiments may be implemented, and is not intended to be limiting. Tendermint provides an effective platform for illustrating the principles described herein, but these principles are applicable to a wide range of distributed ledger implementations.

Tendermint employs a peer-to-peer network in which nodes gossip information including transactions submitted by clients, blocks of transactions proposed by proposers, and various messages used by the consensus protocol used to reach agreement among nodes on successive next blocks in the chain (blockchain). Honest validators vote only for blocks that satisfy certain validity conditions, for example that each block includes a cryptographic hash of the previous block making it essentially impossible to change a block already committed into the blockchain.

Similar to Bitcoin and other decentralized ledgers, Tendermint supports a notion of accounts, each of which has some number of associated tokens. Unlike Bitcoin, in Tendermint these tokens are not created by proof-of-work mining. Instead, the tokens are created by the first, or genesis, block, or are acquired out-of-band, perhaps by purchase.

Tendermint's consensus mechanism is a variant of the PBFT (Practical Byzantine Fault Tolerance) Byzantine agreement algorithm. The current blockchain length is called its height. To add a new block of transactions to the chain, the protocol executes a sequence of rounds. At each height and round, a proposer proposes a block, and validator nodes vote on whether to accept it. Further details are not important for this discussion: Tendermint's consensus mechanism may be used unmodified, and the techniques that are presented are not specific to the consensus protocol.

Tendermint uses a proof of stake (PoS) mechanism to keep validators honest. Each validator posts a bond, in the form of tokens, which it will lose if it is caught violating the protocol. If a validator is caught, proof of that transgression is posted to the blockchain, the culprit is expelled, and its bond is confiscated.

This discussion is less concerned with the specific mechanisms used to punish participants that violate fairness constraints than in how to reduce opportunities for such violations, and how to detect violations when they occur.

Tendermint uses peer-to-peer gossiping to propagate consensus-related information including block proposals, votes, and other state information. Tendermint propagates block data in parts, using a protocol, inspired by LibSwift, in which each block's header contains the root of a Merkle tree. The Merkle tree contains hashes of each block part, allowing confirmation that received block parts are valid.

The mechanisms described herein are independent of these aspects of Tendermint, with minor exceptions mentioned later. Next, several aspects of Tendermint that are more directly relevant to the mechanisms described herein are discussed in more detail.

A focus herein is on the two transaction types that are generally of most direct interest to users. SendTx transactions send tokens from one or more input accounts to one or more output accounts. CallTx transactions create contracts, expressed as Ethereum virtual machine byte code. This establishes an address for the contract, enabling subsequent CallTx transactions to invoke methods of the contract. Contracts are special accounts that have an associated key-value store, which can be modified by the contract's methods. Like SendTx transactions, CallTx transactions have at least one input, which can be used to send tokens to be stored in the contract's account. Contract methods can in turn send tokens from the contract's balance to other accounts (either contracts or regular accounts).

To prevent "replay attacks" in which an attacker could cause a payment to be made twice, each transaction input includes a sequence number known as a nonce. An input is valid only if its nonce is one greater than that of the input from that account in the previous transaction that spends from that account.

A transaction enters the network via a BroadcastTx RPC (Remote Procedure Call) to a node, which may be referred to as an acceptor node. Each node has a local memory pool (mempool) that stores transactions the node has received but has not yet seen included in a committed block. A node validates each transaction before adding it to its mempool. Validation verifies that each of the transaction's inputs have valid signatures, that its account has sufficient balance, and that the nonce is correct. The balance and nonce validations are performed against the state achieved by applying the acceptor's mempool transactions to the last committed block.

A node receiving a transaction from a peer validates the transaction and appends it to its mempool, as described above. A node has a "peer broadcast" routine for each of its peers, which periodically (every 1 millisecond (ms) by default) takes a snapshot of the mempool, and gossips transactions from this snapshot to the peer in the order they appear; preserving this order ensures that nonce values remain in correct sequence.

When a node receives a newly committed block, the node removes from its mempool all transactions included in the block and transactions invalidated by the new state (for example, if the nonce of one of the transaction's inputs is no longer correct); the node then communicates these changes to each peer broadcast routine to suppress unnecessary late gossiping.

The proposer for a given height and round proposes a prefix of its mempool transactions in mempool order, thereby preserving correct nonce order of transactions spending from the same account.

Opportunities to Violate Fairness

The following describes several examples of opportunities to violate fairness in a distributed ledger system such as Tendermint, and is not intended to be limiting.

Censorship:

A proposer could pretend it never received a transaction, either directly from the client, or indirectly via gossip.

Order Manipulation:

A correct proposer proposes transactions within a block in the local mempool order. Nevertheless, a dishonest proposer could reorder transactions without fear of detection, because that proposer's mempool order is not externally visible. In Tendermint, the power to re-order transactions is shared equally among the participants. This is as an example of an unnecessary non-deterministic opportunity to cheat.

Transaction Injection:

After receiving a transaction from a peer, a proposer (or an ally) could create another transaction and order it first. For example, a node that has been bribed by an unscrupulous hedge fund might detect that a pension fund has placed a stock order. That node could inject a buy order in front of the pension fund's order, immediately reselling that stock to the pension fund at a markup, a practice known as front-running.

Enhanced Distributed Ledger System—Overview

This section gives an overview of extensions to a ledger protocol such as Tendermint that may be implemented in embodiments of a distributed ledger system. The following section titled Enhanced Distributed Ledger System—Details presents further details of these embodiments.

Ideally, a proposer should not be able to (1) pretend it has not received a transaction that it received, (2) control which received transactions to include in its proposed block, (3) control their order in the block, or (4) inject transactions ahead of those it has received. Any such attempt should result in undeniable proof of misbehavior, or at least produce evidence that can be accumulated and analyzed after-the-fact.

In some embodiments, fairness violations may be made much more difficult to achieve without detection by imposing deterministic rules governing the order in which transactions are propagated (making "missing" transactions apparent), which transactions are included in each proposed block, and the order in which they appear. This may be achieved by requiring nodes to regularly disclose auditable state information.

Transaction Ingress:

When a node accepts a transaction via a BroadcastTx RPC call, it returns a receipt to the caller. This receipt may be augmented to include acceptor data, which includes an acceptor ID, a sequence number, and an acceptor signature that covers both the transaction and the acceptor ID and sequence number. This data gives the caller undeniable proof that the transaction has been accepted into the network; together with additional protocol extensions described below, it also enables detection of certain attempts to censor the transaction or manipulate its ordering. Focus is now switched to handling transactions that have been accepted.

Accountable Legitimate Censorship:

When a node has a legitimate reason for censoring a transaction (for example, it spends from an account on a government blacklist), the node cannot simply drop the transaction. Instead, the node explicitly invalidates the transaction by appending signed metadata indicating that this transaction is being censored, perhaps including a justification. The marked transaction is forwarded as usual and explicit rejection can be included in a block, making the censorship procedure transparent and accountable.

Transaction Propagation:

Recall that an acceptor validates each transaction against its most recent committed block followed by the earlier uncommitted transactions it has accepted. In contrast to Tendermint, the transaction is not validated again during the gossip protocol. Instead, it is validated again only when a proposer includes it in a block (either processed or explicitly rejected). The initial validation ensures that the transaction can execute successfully in at least some scenarios. The absence of intermediate validation ensures that a node propagating a transaction has no excuse to drop that transaction, ensuring that every such transaction will eventually reach a proposer. The proposer's final validation is definitive.

Tendermint's mempool serves several purposes: (1) to represent state against which incoming transactions are validated, (2) to order transactions for gossiping, and (3) to select transactions for proposals. In embodiments, the mempool may be split into two distinct pieces to reflect this functionality. An acceptor's accepted transaction queue holds the sequence of transactions it has accepted but not yet included into a block. Newly-submitted transactions are validated against a combination of the previously committed block and the transaction's predecessors in that queue. The outgoing queue orders transactions for gossip and for inclusion in proposals (see the subsection titled Using the one-way accountable channel in a protocol such as Tendermint).

To minimize opportunities for nodes to drop or reorder transactions, the following rule may be imposed:

Transaction Propagation Rule:

When a node accepts a transaction from a client or receives one from a peer, it must send that transaction to each of its peers, unless the transaction has already been included in a committed block. All such transactions must be sent in the same order to each peer, in the same order they were received from each peer, and preserving the acceptor ID order for transactions from the same acceptor. There is one exception: a transaction received from multiple peers should be included in the outgoing order once only, and later duplicates are dropped.

The next section describes techniques for making nodes accountable for following this rule, as well as techniques for transaction selection and ordering in transaction proposals, that may be used in embodiments of a distributed ledger system.

Enhanced Distributed Ledger System—Details

This section provides a detailed description of techniques that may be implemented in embodiments of a distributed ledger system to enhance accountability for fairness violations. Tendermint follows the Transaction Propagation Rule presented in the previous section, but there is no mechanism for detecting violations. Furthermore, nodes can easily exclude or reorder transactions without detection. In some embodiments, nodes may be required to regularly disclose concise summaries of their outgoing queues, which can subsequently be audited. Further, to deny proposers power to select and order transactions, each proposal should include proof that deterministic rules were followed to select transactions from the proposer's outgoing queue and order them in transaction proposals.

Detecting violations of the Transaction Propagation Rule requires reliably recording nodes' internal states and communication states. In some embodiments, to address this issue, a one-way accountable channel mechanism (OWAC) may be implemented which provides a building block for accountable one-way communication from one node to another.

One-Way Accountable Channel (OWAC)

Figure 7:
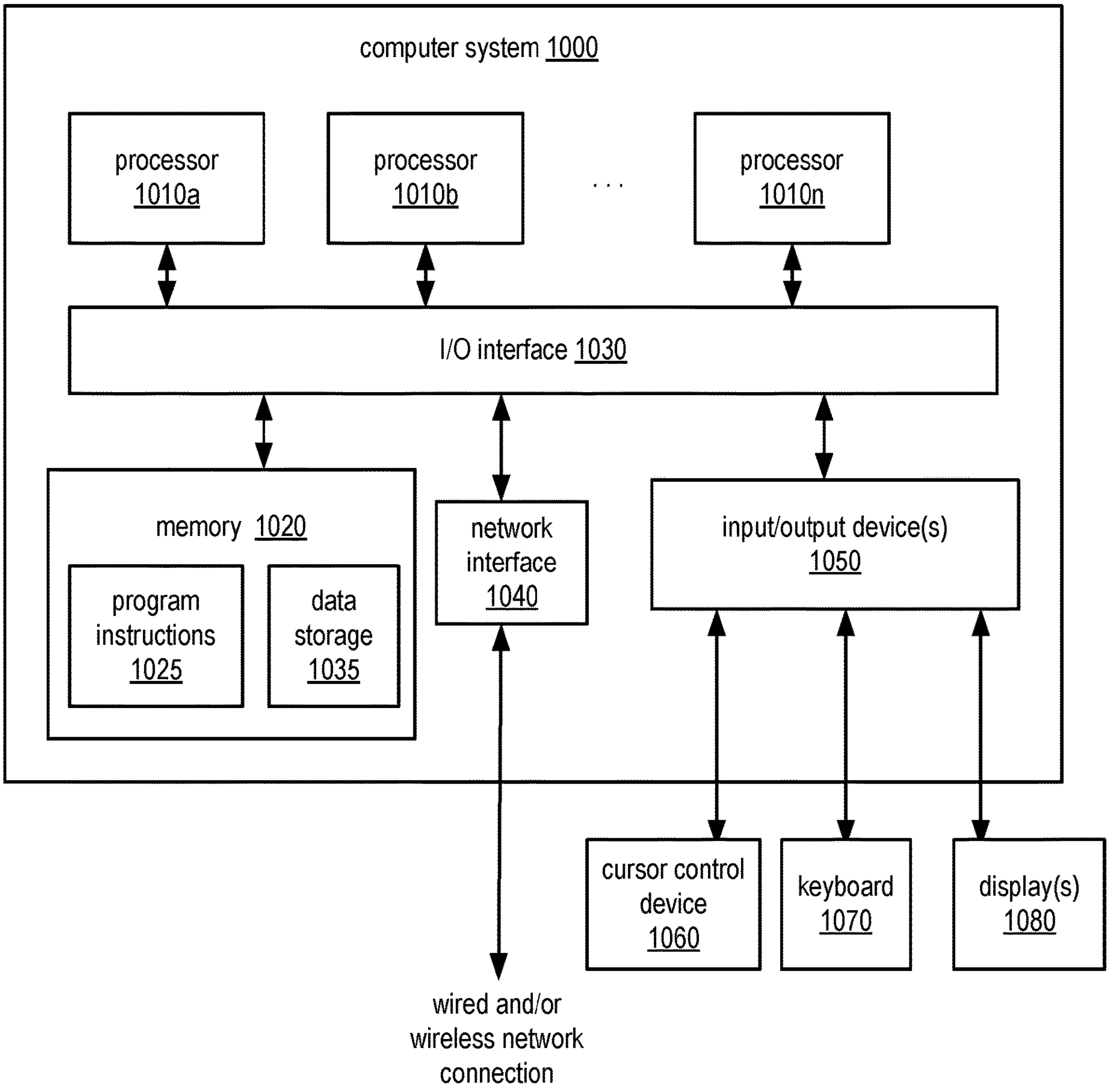
FIG. 7 is a block diagram of a computing device, according to some embodiments.

FIG. 1 illustrates a distributed ledger system 100 that implements a one-way accountable channel mechanism (OWAC), according to some embodiments. A distributed ledger may be broadly defined as a digital record of asset ownership. There is no central administrator of the ledger, nor is there a central data store. Instead, the ledger is replicated 120 across many participating nodes 110 in a peer-to-peer environment that may be geographically spread across multiple sites, countries, or institutions. A node 110 may be any type of computing device, for example a laptop or desktop computer, a mainframe computer, a server, or any of various mobile devices such as smartphones and pad or tablet devices. FIG. 7 illustrates an example computing device that may be used as a node 110. Nodes 110 may communicate according to various wired or wireless technologies and protocols to propose and execute transactions, to participate in a gossip protocol, and so on, as shown by the lines between the nodes 110. Entities or users associated with the nodes 110 and involved in the transactions may include any of various individuals, groups, businesses, institutions, and so on.

In addition to an instance of hardware and/or software that implements the distributed ledger 120 on the nodes 110 (e.g., an implementation of Tendermint technology), each participating node may include an instance of an OWAC 130 mechanism, implemented in software and/or hardware, as described herein. The OWAC 130 may be implemented as part of or integrated with the distributed ledger system technology, or may be implemented as a separate component or module. The OWAC 130 instance on each node 110 may, for example, implement the OWAC protocol and methods presented later in this document in the section titled Example pseudocode for OWAC.

Figure 2:
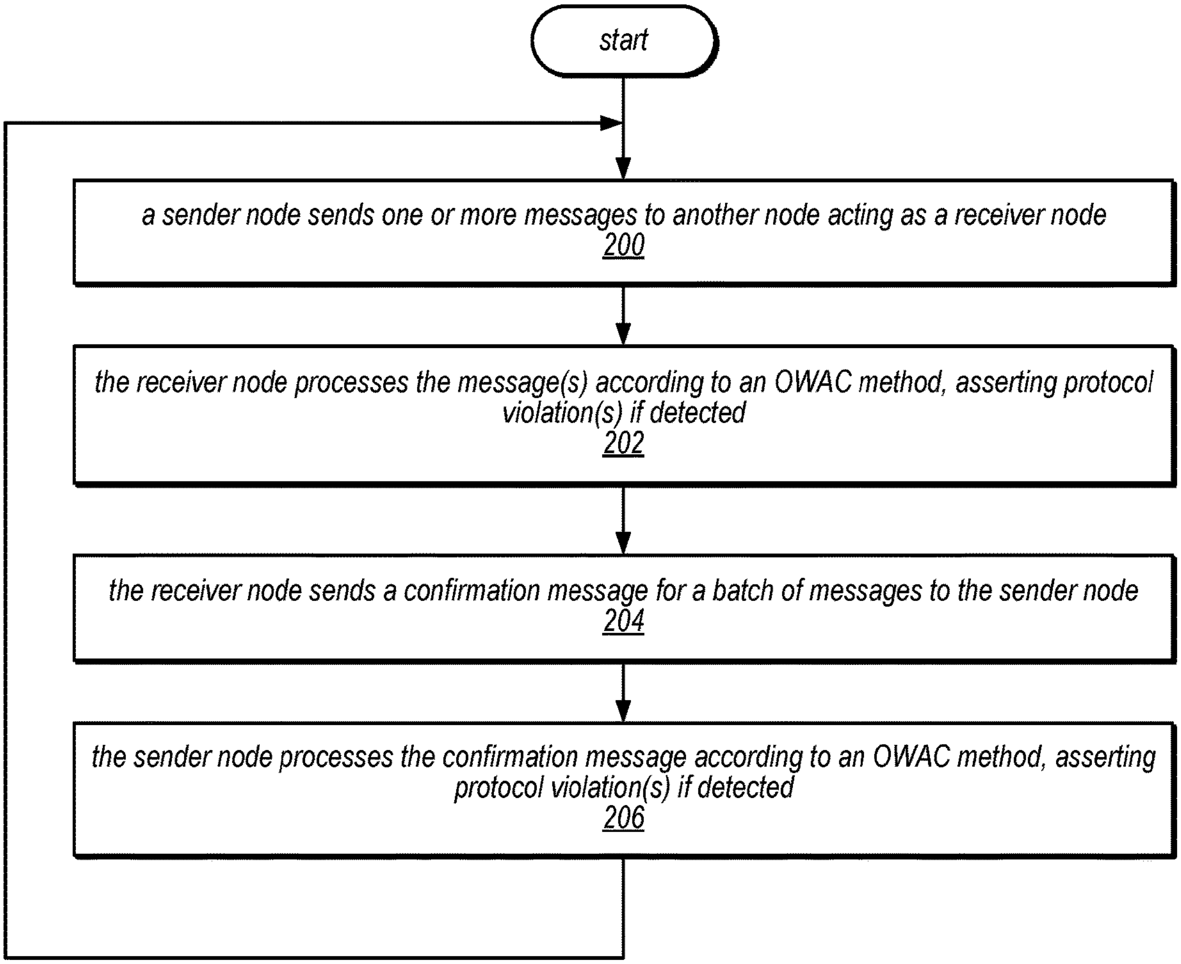
FIG. 2 is a high-level flowchart of a method for processing messages in a distributed ledger system, according to some embodiments.
Figure 3:
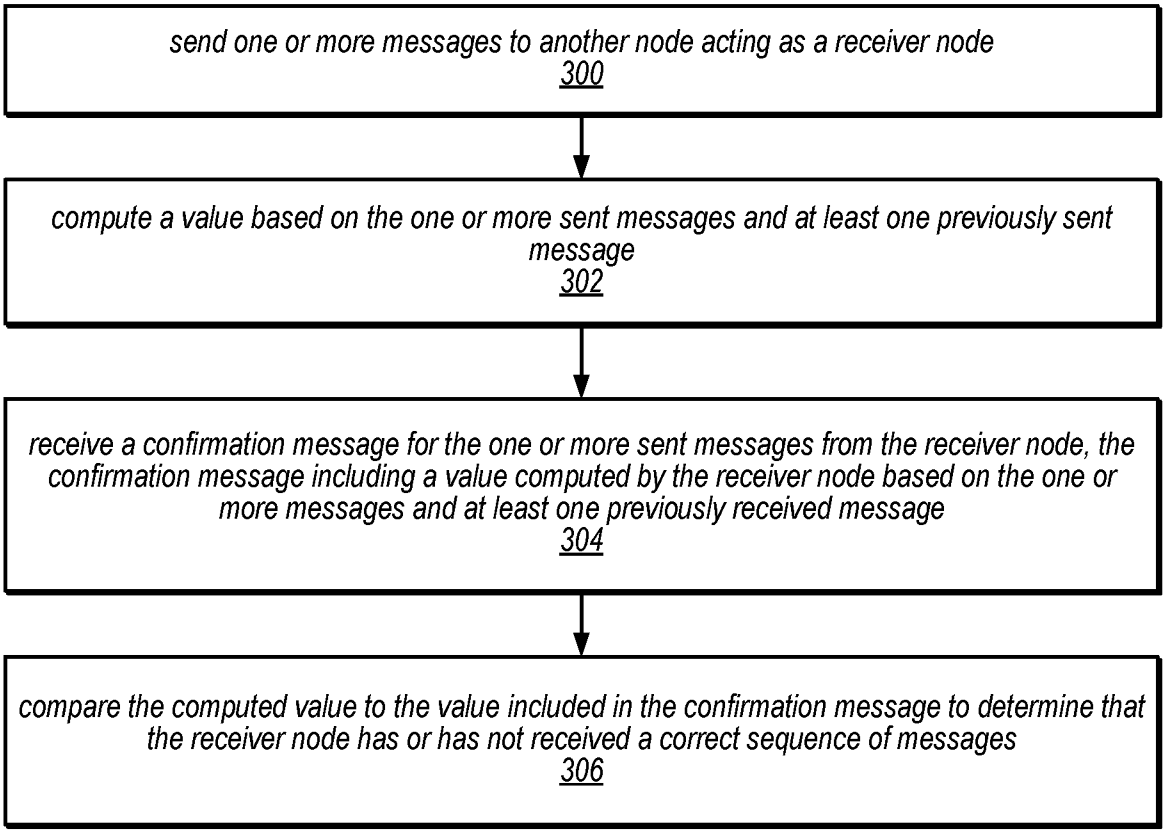
FIG. 3 is a high-level flowchart of a method for processing messages on a sender node, according to some embodiments.
Figure 4:
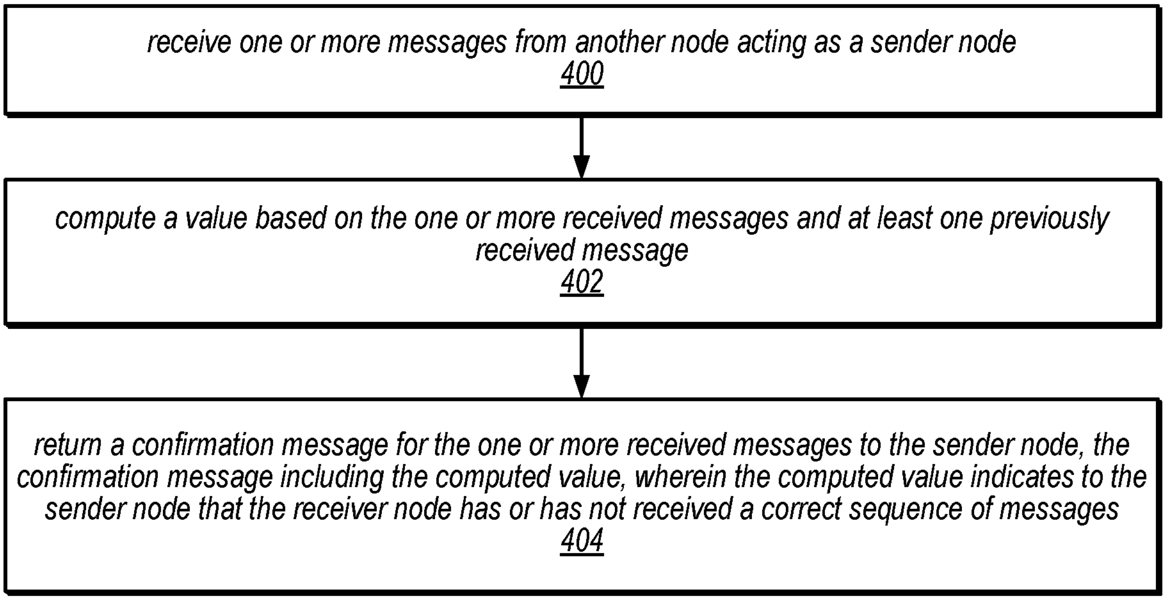
FIG. 4 is a high-level flowchart of a method for processing messages on a receiver node, according to some embodiments.
Figure 5:
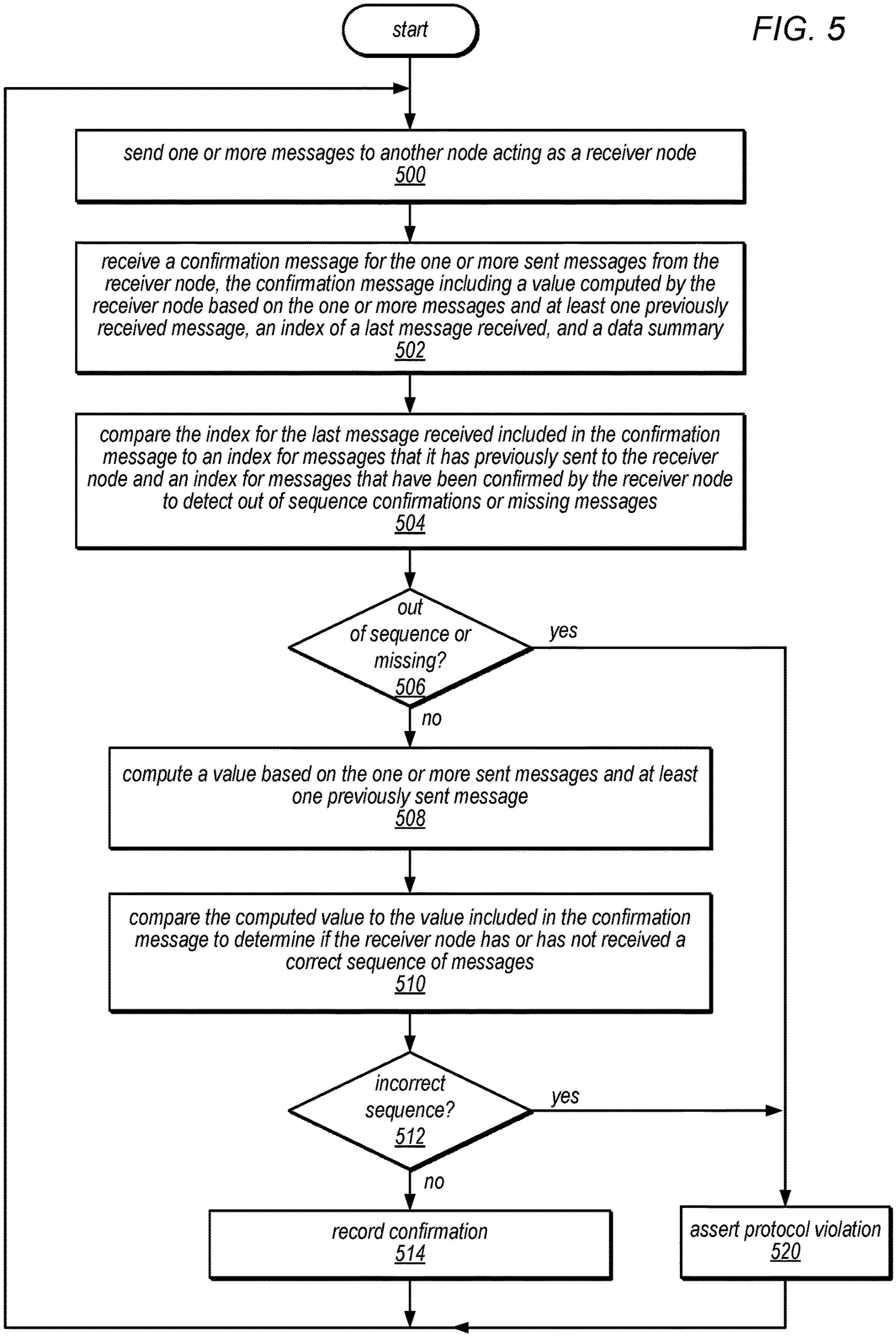
FIG. 5 is a flowchart of a method for processing confirmation messages on a sender node according to an OWAC protocol, according to some embodiments.
Figure 6:
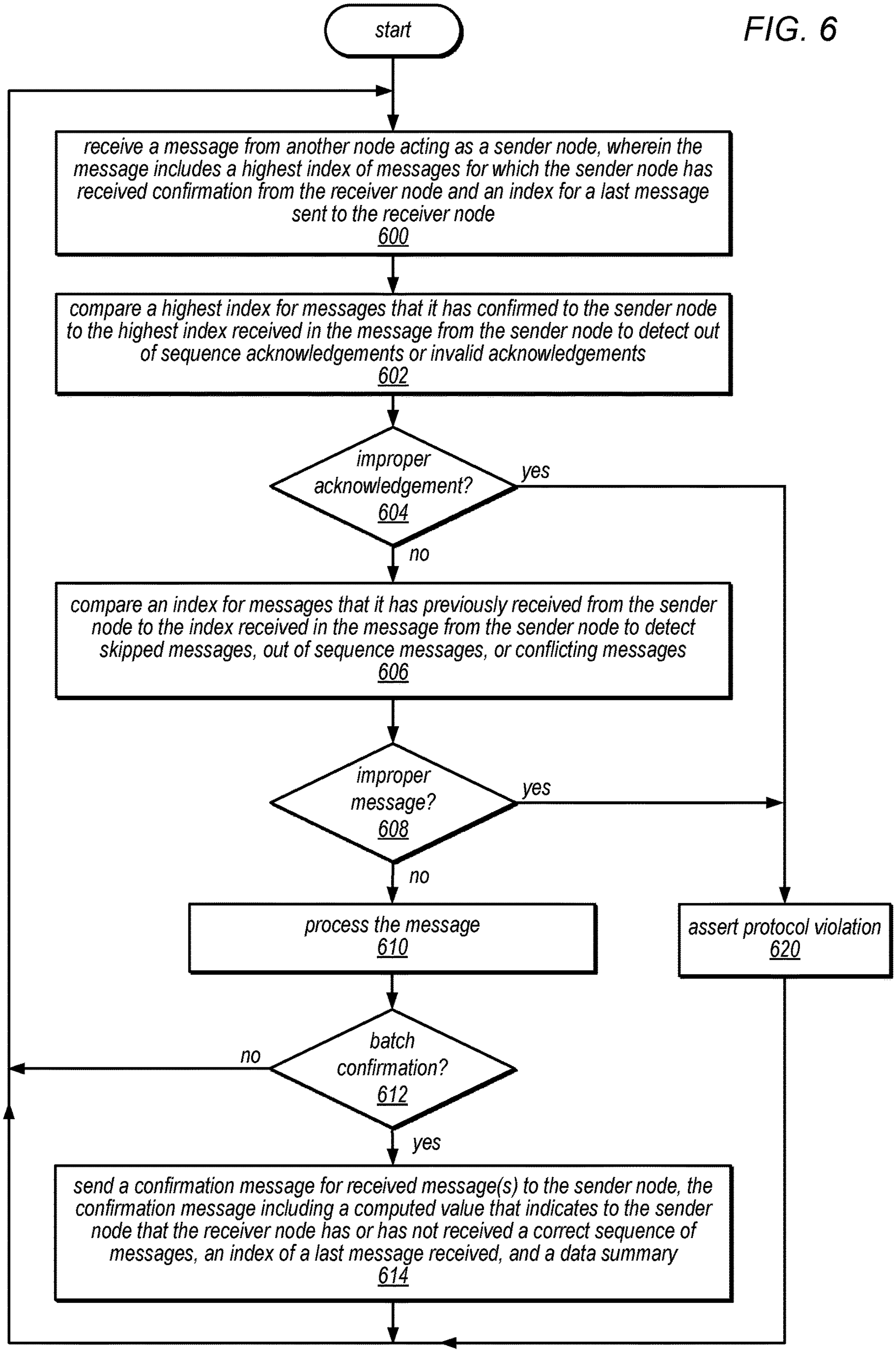
FIG. 6 is a flowchart of a method for processing messages on a receiver node according to an OWAC protocol, according to some embodiments.

FIG. 2 is a high-level flowchart of a method for processing messages in a distributed ledger system as illustrated in FIG. 1, according to some embodiments. As indicated at 200, a sender node sends one or more messages to another node acting as a receiver node, for example as illustrated in FIGS. 3 and 5. As indicated at 202, the receiver node processes the message(s) according to an OWAC method, for example as illustrated in FIGS. 4 and 6, asserting protocol violation(s) if detected. As indicated at 204, the receiver node sends a confirmation message for a batch of messages to the sender node the sender node, for example as illustrated in FIGS. 4 and 6. As indicated at 208, the sender node validates the confirmation message according to an OWAC method, for example as illustrated in FIGS. 3 and 5, asserting protocol violation(s) if detected. The elements of FIG. 2 are described in detail in the following discussion.

As shown in FIG. 1, for the following discussion, node 110A may be designated as sender S, and node 110D may be designated as receiver R, involved in the example interactions and transactions as described herein.

Suppose a sender S sends a sequence of values to a receiver R, which is required to process them in the order sent. Ideally, when S sends a value to R, S would then be able to prove that it had done so, requiring R to process values in the order sent, with no opportunity to examine a message and then pretend not to have received it. Using a conventional cryptographic commitment protocol would require R to acknowledge a message's hash before receiving the message itself, but does not solve the problem: R can still pretend not to have received a message, even after acknowledging its hash. The conventional cryptographic commitment protocol would also require an additional round-trip for each message, which is unacceptable in a gossip protocol.

A goal of embodiments is a pragmatic design that does not overly burden common-case execution, yields proof of deviation when possible, and otherwise yields evidence of possible deviation that can be aggregated over time with other evidence. Detailed example pseudocode illustrating the OWAC protocol is presented later in this document in the section titled Example pseudocode for OWAC. In this section, a summary is presented.

The protocol description serves two purposes. First, it specifies how correct OWAC implementations can behave. Second, it illustrates how a sender S and receiver R can detect and react to protocol violations by the other node. If one party can prove that the other has violated the protocol, it calls a function prove, with the proof as argument. If one party can detect (but not prove) that the other has violated the protocol, it instead calls a function claim, thereby contributing evidence for potential investigation. Each party logs the messages it receives (Line 41 and Line 70), which can be used to support, defend against, or help evaluate allegations of misbehavior.

Validity rules are modeled by a respectsRules method. Similarly, sendConfPolicy represents a policy that decides when R should confirm messages received since its last confirmation, process encapsulates how R processes messages, and summary produces a concise summary of the result.

For brevity, details such as when historical data can be deleted and what happens after one party accuses the other of violating the protocol are elided.

A key idea behind the OWAC protocol is that each party computes, for each message sent, a cryptographic hash based on that message and prior messages. These hashes are cumulative. For example, in some embodiments, the hash for each message is obtained by concatenating the message to the hash of the previous message, and hashing the result; see Lines 36 and 75. In this way, a single hash summarizes the sequence of messages received up to some point. Specifically, R sends confirmation of the messages it has received so far, including the hash of the last message received (Lines 80-81). S checks that the confirmation contains the correct hash for the messages confirmed (Lines 33-37), thus obtaining proof that R has received exactly the messages sent up until that point. S records these confirmations in case R subsequently denies having received the confirmed messages (Line 41).

At any time (Lines 78-79), for example based on a timer or other event, R can confirm receipt of a batch of messages (Lines 80-81), allowing confirmations to be piggybacked onto messages already sent in the host application (for example, Tendermint). Each time S receives a confirmation, it uses the hash calculated in response to the previous batch of confirmations (Line 33) to calculate and store the hash for this batch (Lines 34-36); this facilitates verification of the next confirmation from R (Line 37). Correspondingly, R records the highest index of each batch of messages it confirms (Line 83), so it can check that S correctly acknowledges its confirmations in order (Lines 56-61).

This batching mechanism allows confirmations from R to lag behind messages sent by S. To ensure that R cannot ignore a message without eventually being detected, S allows at most GracePeriod messages to be outstanding without confirmation before it refuses to send additional messages (Lines 18-19). If R ignores a message, S essentially shuts down that channel, thereby ensuring detection.

In addition to confirming messages received, R processes each message (Line 76) and includes with its confirmation a summary of its local data (Line 80), allowing it to prove it has indeed processed all messages received if challenged. Similarly, S includes with each message the highest index for which it has received confirmation (Line 22), so that S cannot subsequently accuse R of failing to confirm messages.

Accusations and Proofs:

In most cases, when S or R detects a violation, the proof is self-explanatory. In some cases, one party can detect that the other party violated the protocol, but cannot prove it to a third party. In such cases, that party calls claim rather than prove. For example, if S were to skip a message (perhaps with the intent of accusing R of ignoring a message it sent), R would detect the omission (Line 62), but would be unable to prove that S did not send the skipped message. Nevertheless, asserting that the other party has misbehaved adds to a body of evidence that may establish a pattern of misbehavior.

In contrast, in some cases, a protocol violation can be proved. For example, if messages sent by S violate application-specific rules encapsulated in respectsRules, R can produce a proof (because the messages are signed by S and cannot be forged). If S resends a previous message, R cannot prove it, and therefore simply asserts a protocol violation (Line 66). On the other hand, if S sends different messages for the same index, R can prove it did so (Line 68).

A primary purpose of enabling S and R to monitor one another's compliance is to discourage noncompliance; therefore violation reports may be rare, especially provable ones.

Example Methods

FIGS. 3 and 4 provide high-level flowcharts of example methods for providing accountability and trust in a distributed ledger system, according to some embodiments. The methods of FIGS. 3 and 4 may, for example, be implemented by the OWAC 130 components on the nodes 110 in the distributed ledger system 100 of FIG. 1. In a distributed ledger system, a plurality of computing devices may be configured to participate as a plurality of nodes in a distributed ledger. Each node locally stores and maintains a copy of the ledger, and each node sends messages including ledger information to others of the nodes via a network according to a ledger protocol, and receives messages including ledger information from others of the nodes via the network according to the ledger protocol.

FIG. 3 is a high-level flowchart of a method for processing messages on a sender node, according to some embodiments. As indicated at 300, a sender node may send one or more messages to another node acting as a receiver node. As indicated at 302, the sender node may compute a value (e.g., a hash) based on the one or more sent messages and at least one previously sent message. In some embodiments, to compute the value, the sender node concatenates the one or more messages to a previously computed hash of the at least one previously sent message and computes a hash of results of the concatenation. As indicated at 304, the sender node may receive a confirmation message for the one or more sent messages from the receiver node, the confirmation message including a value computed by the receiver node based on the one or more messages and at least one previously received message. As indicated at 306, the sender node may compare the computed value to the value included in the confirmation message to determine that the receiver node has or has not received a correct sequence of messages.

In some embodiments, the confirmation message further includes a summary of local data of the receiver node that indicates to the sender node that the receiver node has or has not processed all messages received.

In some embodiments, the messages are indexed, and the sender node includes, in each message sent to the receiver node, an indication of a highest index of messages for which the sender node has received confirmation from the receiver node.

FIG. 4 is a high-level flowchart of a method for processing messages on a receiver node, according to some embodiments. As indicated at 400, a receiver node may receive one or more messages from another node acting as a sender node. As indicated at 402, the receiver node may compute a value based on the one or more received messages and at least one previously received message. In some embodiments, to compute the value, the receiver node concatenates the one or more messages to a previously computed hash of the at least one previously received message and computes a hash of results of the concatenation. As indicated at 404, the receiver node may return a confirmation message for the one or more received messages to the sender node, the confirmation message including the computed value. The computed value indicates to the sender node that the receiver node has or has not received a correct sequence of messages.

The receiver node processes messages received from the sender node, and in some embodiments includes a summary of its local data in the confirmation message that indicates to the sender node that the receiver node has or has not processed all messages received.

In some embodiments, the messages are indexed, and each message received from the sender node includes an indication of a highest index of messages for which the sender node has received confirmation from the receiver node. The receiver node records a highest index for messages that it has confirmed to the sender node for comparison to the highest indexes received in the messages from the sender node.

Using the One-Way Accountable Channel in a Protocol Such as Tendermint

To use the OWAC for gossiping transactions in a protocol such as Tendermint, respectsRules may be instantiated with a method that performs basic validation of transactions and also ensures that each node propagates transactions from each acceptor in acceptor order, thus preventing nodes from dropping or reordering transactions. Nodes are motivated to verify that transactions received from each of its peers are valid and to preserve acceptor order before passing transactions on to their peers; otherwise, they may be blamed for others' transgressions.

Confirmations are piggybacked on consensus-related messages in Tendermint, in which a node informs its peers each time it enters a new consensus round or changes steps within a round (that is, the "event" that triggers confirmations is when the node is sending a RoundStep message anyway).

The process method executed upon receiving a transaction from a peer ensures that the transaction is in the node's outgoing queue. (When a node accepts a transaction from a client, it inserts it into the outgoing queue in the same way after adding acceptor data.) The summary method returns a concise summary of the node's outgoing queue, along with other information described below, allowing the node to subsequently prove that it indeed has the transaction in its outgoing queue (until the transaction is included in a block). The summary serves two purposes: first, it supports gossip accountability by allowing the node to be challenged to prove that it is faithfully following the protocol when gossiping transactions, and second, it allows a proposer to prove that the set of transactions included in its proposed block is consistent with the transaction selection rules discussed in the subsection Selecting transactions for a proposal.

Gossip Accountability:

The summary of the outgoing queue provided by the summary method includes transactions received from all peers (thus, the process and summary methods for all incoming OWACs on a node share a common outgoing queue). Furthermore, summaries include the height and hash of the most recently seen committed block, and a sequence number that orders summaries produced by the same node. The implied ordering allows the outgoing queues represented by two summaries to be compared (even if the two summaries were sent to different peers) to verify that the node did not "lose" or reorder transactions in its outgoing queue, and ensuring that consistent information is being sent to all peers.

To support these accountability mechanisms, a node's outgoing queue may be represented as a key-value store, for example implemented using a dynamic Merkle tree. The keys are integers that order transactions in the outgoing queue, and the values are transactions. (Tendermint includes two Merkle tree implementations. The one used for verifying that the parts of a block's data have been received correctly, as discussed earlier, is for static trees. For the outgoing queue, in some embodiments, a more sophisticated tree structure, for example a Merklized AVL+ tree, may be used. The Merklized AVL+ tree supports dynamic inserts and deletes and is used in Tendermint for purposes such as recording accounts and storage.)

Representing the outgoing queue as a Merkle tree allows each node to provide concise summaries of "snapshots" of its outgoing queue at various times, and to prove the accuracy of subsequent responses to requests for more detailed information about the content of the outgoing queue at those times. The subsection Accountability discusses how this enables accountability mechanisms.

The Merkle tree representation of the outgoing queue supports accountability, but is not conducive to convenient and efficient support for all operations a node must perform on its outgoing queue. Therefore, a node also stores the transactions in its outgoing queue in additional structures that are for internal use only and thus do not require the same accountability functionality.

Specifically, transactions in the outgoing queue are also stored in order in an array, for example as in Tendermint's mempool, with two exceptions: i) transactions that become invalid due to the inclusion of another transaction in a newly-committed block are not removed, because they should continue propagating until they are explicitly rejected from a block. This representation allows peer broadcast routines to efficiently snapshot the outgoing queue, as well as allowing a node to efficiently enumerate transactions to be included in a proposal block.

In some embodiments, a local hash map may be used to map transactions to ordering keys, thereby facilitating efficient quashing of duplicate transactions, as well as efficient removal from the Merkle tree when a transaction is included in a newly-committed block.

Persons skilled in the art, given benefit of the description provided herein and the open-source Tendermint code or other distributed ledger systems, may readily implement these techniques as described. It may also be appreciated that a range of alternative ways to achieve the same goals are recognized, for example: i) complying with the Transaction Propagation Rule, ii) providing concise summaries of its outgoing queue, and iii) using these summaries to prove that details provided later are consistent with the summaries.

Accountability

Who performs accountability checks, and how often and why accountability checks are performed, are beyond the scope of this discussion. Instead, the focus is on how the mechanisms described herein help detect violations of the Transaction Propagation Rule.

As described already, whenever a node confirms a batch of received transactions, it includes the root hash of the Merkle tree representing its outgoing queue. If the node is challenged to prove that a given transaction was included in the outgoing queue as of a certain summary, or even to provide the queue's entire contents, it can prove the accuracy of its response using standard Merkle proof techniques.

A peer can compare the transactions it has sent to a node against such snapshots of the node's outgoing queue to detect if the node "loses" or reorders transactions. The block height and hash included in summaries enable confirmation that transactions are removed only when they are included in a block.

If a node is found to have cheated, for example by removing or reordering transactions in the outgoing queue, the summaries and contents can provide proof that the node has violated the rules. If a node is unwilling or unable to respond to a challenge, it can be penalized using built-in mechanisms such as forfeiting tokens or being excluded, as well as external mechanisms such as lawsuits, regulatory penalties, and reputational harm. How long a node is required to retain data to facilitate responses to challenges is a policy question.

Selecting Transactions for a Proposal

The mechanisms that support outgoing queue accountability can also limit proposers' power to select transactions. The Transaction Propagation Rule that was previously described implies that a node can choose any prefix of its outgoing queue to form a block proposal with the following property: for any transaction in the proposal, all previous transactions from the same acceptor have either already been included in a committed block, or are also included in the proposal.

The length of the proposed prefix is a policy issue, but should be deterministic to avoid manipulation by proposers. For example, a constant number could be chosen, or the longest prefix not exceeding a fixed transaction size total. Relevant parameters could be fixed at creation time (e.g., in the ledger's "genesis" block), adjusted deterministically (similar to Bitcoin's difficulty level), or adjusted by the ledger's governing body.

Including the outgoing queue's Merkle root in a proposal enables responses to subsequent challenges to prove the proposal complies with the deterministic policy. Even greater accountability can be achieved by requiring verification before committing the block.

In some embodiments, a mechanism for communicating blocks and transactions such as Tendermint's mechanism can be extended to include a representation of the outgoing queue. Optimizations can largely avoid the increase in bandwidth and storage costs resulting from a naive implementation. First, note that the block need not include the entire contents of the outgoing queue. It suffices to include enough of the outgoing queue to cover all selected transactions, plus additional hashes to enable verification that these transactions indeed form the correct prefix of the outgoing queue. For example, if only the left subtree leaves are included, a representation of the left subtree may be included that would prove that the selected transactions form an appropriately-sized prefix of the outgoing queue, together with the root hash of the right subtree. This information is enough to verify that the selected transactions were a prefix of the outgoing queue.

This example may be generalized. Tendermint's Merkle AVL+ tree has an in-order traversal method that applies a provided function to each node visited. The function returns an indication of whether the traversal should stop. A simple modification of this mechanism allows traversal to continue after enough transactions have been collected, but to refrain from recursion into each new subtree encountered, instead yielding the hash of the subtree's root. The result is a disclosure of the outgoing queue that suffices to verify that the selected transactions are a prefix of the outgoing queue, and that the Merkle root of the outgoing queue matches the one included in the block header. Tree size is linear in the number of selected transactions, and is independent of the total number of transactions in the outgoing queue. Since only proposal transactions (and not the entire outgoing queue) are included, the partial Merkle tree can replace transactions with their indexes in the block. Validators need not persist the partial Merkle tree after verification.

Ordering Proposal Transactions

Nodes have some control over the order in which transactions received from different peers at around the same time are added to their outgoing queues. In some embodiments, to avoid abuse, a proposer should reorder transactions in a way that nobody can influence and everyone can verify. Simply randomizing the order may not be feasible, because this could violate dependencies between valid transactions that spend from the same account, resulting in rejection due to incorrect nonce values.

In some embodiments, while proposers should preserve the order of transactions that spend from the same account, there is not a requirement to preserve acceptor order. Acceptor order serves only to ensure that transactions cannot surreptitiously be dropped in transit.

There are many ways to ensure that the order in which transactions are proposed for commitment into the blockchain cannot be unfairly manipulated in embodiments. First, order the transactions in a random order beyond anyone's control. A simple and efficient way is to use a pseudorandom number generator seeded using the previous block's hash xor'd with the acceptor signature of the first selected transaction. This scheme resists manipulation because no one can control the generator's seed.

Next, the transactions may be processed in the permutation order, deferring consideration of any transaction that cannot yet be processed because its nonce is out of order. Deferred transactions remain in permutation order. Once all transactions have been considered, the deferred transactions are similarly processed in permutation order, again deferring any transaction that still cannot be processed because its nonce is out of order. This process is repeated until all transactions have been processed, or until a full pass over the deferred transactions yields no more processable transactions. Since there is no way to order the remaining transactions, they can be explicitly rejected.

In principle, this process could take $O(n^2)$ time for n transactions, but such behavior is highly unlikely. It would require the selected and permuted transactions to include a sequence of O(n) transactions, each of which depends on its successor. So many dependent transactions rarely happen, and it is even more unlikely that a random permutation would produce this ordering.

There is a variety of alternative mechanisms for randomizing transaction order and for restoring any dependencies violated by doing so that may be used in various embodiments. For example, transactions could be sorted according to a function that nobody can control. One example among many possibilities for randomizing the order would be to compute the difference between an appropriately chosen number of bits of a transaction's hash or acceptor signature and some value dependent on other factors beyond anyone's control, such as the previous block's hash. To restore violated dependencies while avoiding the potential $O(n^2)$ worst case discussed above, an observation is that a transaction that spends from k accounts enables at most k more transactions (a transaction that spends from each of the input accounts using the nonce value following the one in the input). This fact can be exploited to define asymptotically superior transaction ordering. For example, transactions could be inserted into a forest in which each k-input transaction has at most k children, representing the dependencies discussed above, and transactions ordered by a deterministic traversal of all trees in the forest, with each transaction ordered before any of its children.

Enhanced Distributed Ledger System—Further Discussion

This section provides further discussion of several aspects of the enhanced distributed ledger system as described herein.

Performance:

On one hand, embodiments may eliminate the need for every transaction to be executed by every node as it propagates through the network. On the other hand, embodiments may also add overhead in various ways. Decentralized ledger technology has the potential to dramatically reduce cost and latency of transactions by eliminating the need for trusted intermediaries that often add days to transaction settlement times. Thus, embodiments may be optimized for trust and accountability before focusing on smaller performance improvements.

Resolving Differences:

Embodiments may be focused on how to make it extremely difficult to manipulate outcomes without detection, while enabling participants to explicitly reject a transaction and provide a reason, as is likely to be required in many use cases to comply with legal requirements. The question of how a proposer should resolve a transaction's outcome if it receives the transaction normally from some peers and rejected from others has not been addressed. Another question is whether a transaction could be included by a subsequent proposer after being rejected in an earlier block.

These are primarily policy matters for a given ledger, but they also intersect with implementation details. This is one example that illustrates the benefits of refactoring implementations and allowing different components to be instantiated differently for different use cases, as opposed to all functionality being included in one monolithic code base. The techniques and methods described herein may be translated to and applied in various contexts.

Acceptor Manipulation:

Embodiments may not provide benefits to transactions unless they can be accepted by an acceptor. An acceptor could refuse to accept or even acknowledge a transaction. More subtly, an acceptor could attempt to manipulate acceptance order by buffering transactions before assigning acceptor IDs. However, because acceptor order does not directly control the final order (see the subsection titled Ordering proposal transactions), its only means of influencing transaction order is by significantly delaying transactions. This might be detectable but difficult to prove, especially for isolated cases. However, if attempted regularly or in relation to particularly important transactions, the mechanisms described herein for making transaction propagation and ordering accountable provide evidence that can contribute to analysis, perhaps in combination with other evidence.

These mechanisms discourage practices such as front running, in which an acceptor attempts to insert a transaction of its own before another one it receives. Collusion between a proposer and an acceptor (which may be the same party in some configurations) could attempt to insert a transaction, but the mechanisms that have been described to make outgoing queue maintenance accountable and to deny proposers control over transaction order make such practices extremely difficult and ensure any attempt yields evidence. If stronger protection is desired, additional rules could be imposed, such as forbidding proposers from including transactions that they have accepted themselves, or requiring such transactions to be ordered at the end of the block, or to be gossiped at least once before being included in a block.

Permissioned acceptors that are suspected of manipulation can be held accountable in various ways in addition to mechanisms that penalize them directly. For example, they may lose business or face regulatory scrutiny or community pressure. If a substantial fraction of acceptors misbehave, trust in the overall network may be diminished, reflecting that the choice of permissioned participants was or has become poor.

Integrating External Decisions:

Permissioned ledgers aim to take advantage of existing trust and accountability mechanisms, while recognizing that they can never be absolute. The focus has been primarily on technical methods for making undetectable violation of rules difficult. In some cases, such violations can be proved, allowing for "transactional punishment" without human intervention. For example, Tendermint allows a node that signs conflicting votes to be automatically penalized via an administrative transaction that confiscates its "stake"; other provable infractions that have been enabled by embodiments can similarly be automatically punished. Nonetheless, some violations, including acceptor manipulation, can be punished only based on judgements made outside the system (possibly informed by evidence produced by the system).

This raises the question of what can be done when such external judgments are made. Again, this is a policy matter that intersects with technical details. For example, the rules governing a given ledger might enable a majority of participants to impose a penalty on one party, or, say five out of seven members of a governance board to permanently exclude the party that is judged to be behaving dishonestly.

No technical solution can prevent or solve all human disagreements, but by making the ledger's rules precise and violations of the rules detectable, many disagreements can be avoided in the first place, and mechanisms for giving effect to "administrative" decisions following well-defined governance procedures can facilitate effective resolution even when human input is needed.

Legitimate Losses:

As described so far, transactions could be lost through no malicious intent. An acceptor might crash immediately after sending a response and before sending the transaction to its peers. This raises the question: should it be held responsible for the loss of the transaction in this case and if so how?

If transaction loss is sufficiently undesirable, an acceptor may be heavily penalized for such a loss, giving it an incentive to ensure this does not happen. For example, it could do so by persisting the transaction before sending the receipt, which would add significant overhead using traditional storage technologies. As nonvolatile RAM becomes less expensive and more widely available, avoiding such losses may impose less overhead, thus reducing the level of penalties needed to encourage avoiding it.

Fault Tolerance:

As described, the protocol may be susceptible to failures, such as a node crashing and missing messages. To resume normal operation, a restarting node can report the outage via administrative transactions; downstream nodes can "forgive" the omissions, which are made visible and accountable by the administrative messages.

Example Pseudocode for OWAC

The following provides example pseudocode for a protocol in which Sender S sends sequence of values to Receiver R, and Receiver R confirms messages correctly received. Confirmations may lag sends by up to GracePeriod messages, but sending does not continue after that unless and until confirmations catch up within GracePeriod. Detected protocol violations are reported via claim when undeniable proof cannot be provided, and via prove when it can; in the latter case, data on which proof may be based may be included as arguments. Each method executes atomically. An example HashFunction that may be used in embodiments is RIPEMD160; other hash functions may be used. This pseudocode is given by way of example and is not intended to be limiting.

```
Constants

GracePeriod: integer // max. confirmation "lag"
connID: connection ID // to avoid replay attacks



Sender S

ValsSent: array of values
lastSent: integer = −1 // last sent index
lastConf. integer = −1 // last confirmed index
hashCache: integer → hash = {(−1, 0)}
confirmations: integer → signed message = { }
chanR: secure FIFO channel to receiver R

boolean send(v) // S sends message to R
    //S allows at most GracePeriod messages to be outstanding
    without confirmation
    if lastSent > lastConf + GracePeriod
        return false // confirmations too far behind
    lastSent++
    ValsSent[lastSent] = v
    m = (connID, lastSent, v, lastConf)
    chanR.send(sign_s(m))
    return true

when Receive m = (k, confHash, s) // S receives confirmation from R;
```

-continued

```
            k = last received; // confHash =
            hash value; s = summary
    if not verifySig (m)
        claim ("invalid signature")
    if k ≤ lastConf
        claim ("confirmation out of sequence")
    if k > lastSent
        claim ("cannot confirm unsent values")
    j, h = lastConf, hashCache[lastConf]
    while j < k
        j++
        // concatenate the message to the hash of the previous
        message, and hash the result
        h = HashFunction (h · ValsSent[j])
    hashCache[k] = h
    if confHash ≠ h
        claim ("incorrect hash confirmation")
    lastConf = k
    confirrmations[lastConf] = m // record confirmation

Receiver R

Msgs: integer → signed message = { }
Data: recorded effects of processed messages
lastRcvd: integer = −1 // received index
lastConf: integer = −1 // last confirmed index
lastAckd: integer // last acknowledged index
seqHash: hash = 0 // hash of value sequence
chanS: secure FIFO channel to sender S

when Receive m = (i, v, k) // i = last Sent; v = value; k = last
Confirmed
    if not verifySig (m)
        claim ("invalid signature")
    if k < lastAckd
        claim ("acknowledgement out of sequence")
    if k > lastAckd
        if k ≠ pendingConfs:removeMin( )
        claim ("invalid acknowledgement")
        lastAckd = k
    if i > lastRcvd + 1
        claim ("skipped message")
    if i < lastRcvd + 1
         if Msgs[i] = m
            claim ("duplicate message")
        else
            prove ("conflicting messages", m, Msgs[i])
    lastRcvd = i
    Msgs[lastRcvd] = m
    if lastRcvd > lastAckd + GracePeriod
        prove ("too far ahead", Msgs, lastRcvd)
    if not respectsRules (Msgs, lastRcvd) // validity rules model
        prove "rules violated", Msgs, lastRcvd)
    // concatenate the message to the hash of the previous message,
    and hash the result
    seqHash = HashFunction (seqHash · v)
    process (Data, v)        // R's message processing

when Event // timer or other event
    if sendConfPolicy (lastAckd, lastConf, lastRcvd) // confirm
        received messages? // generate confirmation
        for a batch of messages
        m = (connID, lastRcvd, seqHash, summary(Data))
        C.send(signR(m)) // send confirmation
        lastConf = lastRcvd
        pendingConfs.insert(lastRcvd) // record the highest index
        of the batch
```

FIG. 5 is a flowchart of a method for processing confirmation messages on a sender node according to an OWAC protocol as illustrated above, according to some embodiments. The method of FIG. 5 may, for example, be performed by a node acting as a sender node as illustrated in FIG. 1.

As indicated at 500, a sender node may send one or more messages to another node acting as a receiver node. The messages may include ledger information according to the distributed ledger system. For example, in some embodiments, the ledger information in a given message may include a transaction submitted by clients of the distributed ledger, a block of transactions proposed by proposers in the distributed ledger, or a message used by a consensus protocol of the distributed ledger to reach agreement among the nodes on successive next blocks in a blockchain. In some embodiments, a given message sent to the receiver node also includes a highest index of messages for which the sender node has received confirmation from the receiver node and an index for a last message sent to the receiver node; the indexes may, for example, serve as acknowledgements for previously received confirmations, and may be processed by the receiver node as shown in FIG. 6.

While not shown in FIG. 5, in some embodiments, prior to sending the message(s) to the receiver node, the sender node may check to determine if the receiver node is too far behind on confirmations, for example by comparing an index or time of its last sent message to an index or time of its last received confirmation message plus a grace period. If the receiver node is too far behind, the sender node may not send the message(s) or may delay sending the message(s) until the receiver node catches up on its confirmations.

As indicated at 502, the sender node may receive a confirmation message for the one or more sent messages from the receiver node. The confirmation message may include a value computed by the receiver node based on the one or more messages and at least one previously received message. In some embodiments, the confirmation message may also include an index of a last message received by the receiver node, and a data summary for the receiver node.

As indicated at 504, the sender node may compare the index for the last message received included in the confirmation message to an index for messages that it has previously sent to the receiver node and an index for messages that have been confirmed by the receiver node to detect protocol violations including but not limited to out of sequence confirmations or missing messages.

At 506, if a protocol violation is detected, then the sender node generates an assertion for the violation as indicated at 520. In some embodiments, if the detected protocol violation can be proved, the sender node calls a function prove, with the proof of the violation as an argument. If the detected protocol violation cannot be proved, the sender node instead calls a function claim, thereby contributing evidence for potential investigation. At 506, if a protocol violation is not detected, then the method proceeds to 508.

While not shown in FIG. 5, in some embodiments the sender node may verify a signature of the confirmation message and, upon detecting an invalid signature, assert a protocol violation. In some embodiments the confirmation message may also include a summary of the receiver node's local data. The summary may, for example, indicate to the sender node that the receiver node has or has not processed all messages received. In some embodiments, the sender node may assert a protocol violation upon detecting a violation according to the summary.

As indicated at 508, the sender node may compute a value (e.g., a hash) based on the one or more sent messages and at least one previously sent message. In some embodiments, to compute the value, the sender node concatenates the one or more messages to a previously computed hash of the at least one previously sent message and computes a hash of results of the concatenation.

As indicated at 510, the sender node may compare the computed value to the value included in the confirmation message to determine that the receiver node has or has not received a correct sequence of messages. In some embodiments, if the computed value matches the value included in the confirmation message, then the confirmation is correct; otherwise, the confirmation is incorrect, and a protocol violation has been detected. At 512, if the sender node detects a protocol violation according to the value included in the confirmation message, then the sender node generates an assertion for the violation as indicated at 520. Otherwise, the method proceeds to 514, where the confirmation is recorded.

The arrow returning from elements 514 and 520 to element 500 indicates that the method of FIG. 5 may be a continuous process, with the sender node sending messages to the receiver node, the receiver node returning confirmations for messages to the sender node, and the sender node processing the confirmations. Also note that the sender node may send messages to and receive confirmations from multiple nodes acting as receiver nodes, and may also act as a receiver node for one or more other modes acting as sender nodes. Also note that the order of the elements in FIG. 5 is not intended to be limiting. For example, in some embodiments, elements 508 through 512 may be performed prior to elements 504 and 506, or concurrently with elements 504 and 506.

FIG. 6 is a flowchart of a method for processing messages on a receiver node according to an OWAC protocol as illustrated above, according to some embodiments. The method of FIG. 6 may, for example, be performed by a node acting as a receiver node as illustrated in FIG. 1.

As indicated at 600, a receiver node may receive a message from another node acting as a sender node. The message may include ledger information according to the distributed ledger system. For example, in some embodiments, the ledger information in a given message may include a transaction submitted by clients of the distributed ledger, a block of transactions proposed by proposers in the distributed ledger, or a message used by a consensus protocol of the distributed ledger to reach agreement among the nodes on successive next blocks in a blockchain. The message also includes a highest index of messages for which the sender node has received confirmation from the receiver node and an index for a last message sent to the receiver node; the indexes may, for example, serve as acknowledgements for previously received confirmations.

While not shown in FIG. 6, in some embodiments the sender node may verify a signature of the message and, upon detecting an invalid signature, assert a protocol violation as indicated at 620.

As indicated at 602, the receiver node may compare a highest index for messages that it has confirmed to the sender node to the highest index received in the message from the sender node to detect improper acknowledgements such as out of sequence acknowledgements or invalid acknowledgements. At 604, if an improper acknowledgement is detected, then the receiver node asserts a protocol violation as indicated at 620. In some embodiments, if the detected protocol violation can be proved, the receiver node calls a function prove, with the proof of the violation as an argument. If the detected protocol violation cannot be proved, the receiver node instead calls a function claim, thereby contributing evidence for potential investigation. At 604, if no protocol violation is detected according to the index, then the method proceeds to 606.

As indicated at 606, the receiver node may compare an index for messages that it has previously received from the sender node to the index for a last message sent to the receiver node received in the message from the sender node to detect improper messages such as skipped messages, out of sequence messages, or conflicting messages. At 608, if an improper message is detected, then the receiver node asserts a protocol violation as indicated at 620.

While not shown in FIG. 6, in some embodiments, the receiver node may check to determine if the sender node is too far ahead on acknowledgements of confirmation message, for example by comparing an index or time of its last received message to an index or time of its last received acknowledgement plus a grace period. If the sender node is too far ahead, the receiver node may assert a protocol violation. In some embodiments, the receiver node may also apply a validity rules model to the message, and may assert a protocol violation if a violation is detected according to the model.

At 608, if no protocol violation is detected according to the index, then the method proceeds to 610, where the message is processed. In some embodiments, processing the message includes computing a value that indicates to the sender node that the receiver node has or has not received a correct sequence of messages, and processing the message according to the receiver node's distributed ledger message processing functionality. In some embodiments, to compute the value, the receiver node concatenates the message to a previously computed hash of at least one previously received message and computes a hash of results of the concatenation.

The receive node may periodically or aperiodically send confirmation messages to the sender node for message(s) from the sender node that it has received and processed. At 612, the receiver node may check to see if a confirmation message should be sent, for example based on a timer or some other event. If not, then the receiver node does not send a confirmation message at that time. If so, then the receiver node generates a confirmation message for a batch of one or more received and processed messages, and sends the confirmation message to the sender node, as indicated at 614. In some embodiments, the confirmation message includes one or more of the computed value that indicates to the sender node that the receiver node has or has not received a correct sequence of messages, an index of a last message received, and a data summary. The sender node may process the confirmation message as shown in FIG. 5. While not shown in FIG. 6, the receiver node may record information including but not limited to the highest index of the message(s) in the batch of processed messages that were confirmed by the confirmation message.

The arrow returning from elements 612, 614, and 620 to element 600 indicates that the method of FIG. 6 may be a continuous process, with the receiver node receiving and processing messages from the sender node, the receiver node returning confirmations for messages to the sender node, and the sender node processing the confirmations. Also note that the receiver node may receive and process messages from and send confirmations to multiple nodes acting as sender nodes, and may also act as a sender node for one or more other nodes acting as receiver nodes. Also note that the order of the elements in FIG. 6 is not intended to be limiting. For example, in some embodiments, elements 606 and 608 may be performed prior to elements 602 and 604, or concurrently with elements 602 and 604.

Example Computing System

Various components of embodiments of the techniques and methods described herein for providing enhanced accountability and trust in distributed ledger systems may be executed on one or more computer systems or computing devices, which may interact with various other devices. One such computer system or computing device is illustrated by FIG. 7. In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, audio device 1090, and display (s) 1080. In some embodiments, it is contemplated that embodiments may be implemented using a single instance of computer system 1000, while in other embodiments multiple such systems, or multiple nodes making up computer system 1000, may be configured to host different portions, components, or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computer system. Modern GPUs may be very efficient at manipulating and displaying computer graphics, and their highly parallel structure may make them more effective than typical CPUs for a range of graphical algorithms. For example, a graphics processor may implement a number of graphics primitive operations in a way that makes executing them much faster than drawing directly to the screen with a host central processing unit (CPU). The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for various embodiments of methods for providing enhanced accountability and trust in distributed ledgers including but not limited to methods for processing distributed ledger messages as a sender node and/or as a receiver node as illustrated in FIGS. 2 through 6, are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 7, memory 1020 may include program instructions 1025, configured to implement embodiments of the methods for providing enhanced accountability and trust in distributed ledgers, and data storage 1035, comprising various data accessible by program instructions 1025. In one embodiment, program instructions 1025 may include software elements of embodiments of the methods for providing enhanced accountability and trust in distributed ledgers, as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of the methods for providing enhanced accountability and trust in distributed ledgers as described herein. In particular, the computer system and devices may include any combination of hardware or software that can perform the indicated functions, including computers, network devices, internet appliances, PDAs, wireless phones, pagers, etc. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

The various methods as illustrated in the Figures and described herein represent examples of embodiments of methods. The methods may be implemented in software, hardware, or a combination thereof. The order of the methods may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

a plurality of computing devices configured to participate as a plurality of nodes, including a first node and a second node, in a distributed ledger, wherein individual nodes of the plurality of nodes locally store and maintain a copy of a ledger, and wherein the first node is configured to:

send messages including ledger information to others of the plurality of nodes via respective ones of a plurality of channels over a network according to a ledger protocol; and receive one or more messages from the second node to execute at least one transaction on an account of the distributed ledger according to the ledger protocol;

concatenate a particular message of the one or more received messages and a hash computed from at least one message previously received from the second node to generate concatenated data, wherein the particular message and the at least one message previously received individually comprise communications from the second node to the first node;

compute the value comprising a hash of the concatenated data;

execute the at least one transaction on the account of the distributed ledger according to the ledger protocol;

return a confirmation message for the one or more received messages to the second node, the confirmation message including the computed value and an index for a last message received by the first node from the second node;

record respective indexes for messages previously sent from the first node to the second node and the index for the last message received by the first node from the second node;

compare the index for the last message received to the recorded indexes to detect out of sequence confirmations or missing messages; and upon detecting a skipped message, an out of sequence message, or a conflicting message, assert that the second node has violated the ledger protocol; and wherein the second node is configured to:

compute a value based on a plurality of messages and a sequence in which the plurality of messages were received; and compare the computed value to the particular value included in the confirmation message to determine whether the first node has or has not correctly executed the at least one transaction on the account of the distributed ledger according to the ledger protocol.

2. The system as recited in claim 1, wherein the first node is further configured to process the messages received from the second node and include a summary of its local data including results of said processing in the confirmation message, wherein the summary indicates to the second node whether the first node has or has not processed all messages received.

3. The system as recited in claim 1, wherein each message received from the second node includes a highest index of messages for which the second node has received confirmation from the first node, and wherein the first node records a highest index for messages that it has confirmed to the second node for comparison to the highest indexes received in the messages from the second node to detect out of sequence acknowledgements or invalid acknowledgements, wherein, upon detecting an out of sequence acknowledgement or an invalid acknowledgement, the first node is configured to assert that the second node has violated the ledger protocol.

4. The system as recited in claim 1, wherein each message received from the second node includes an index for a last message sent to the first node from the second node, and wherein the first node records an index for messages that it has previously received from the second node for comparison to the indexes for last messages received in the messages from the second node to detect skipped messages, out of sequence messages, or conflicting messages, wherein, upon detecting a skipped message, out of sequence message, or conflicting message, the first node is configured to assert that the second node has violated the ledger protocol.

5. The system as recited in claim 1, wherein the second node is configured to:

send the one or more messages to the first node;

compute a value based on the one or more sent messages and at least one previously sent message;

receive the confirmation message for the one or more sent messages from the first node, the confirmation message including the value computed by the first node based on the one or more messages and at least one previously received message; and compare the computed value to the value included in the confirmation message to determine whether the first node has or has not received and confirmed a correct sequence of messages;

wherein, upon determining that the first node has not received and confirmed a correct sequence of messages, the second node is configured to assert that the first node has violated the ledger protocol.

6. The system as recited in claim 5, wherein, to compute the value, the second node is configured to concatenate the one or more messages to a previously computed hash of the at least one previously sent message and compute a hash of results of the concatenation.

7. The system as recited in claim 6, wherein the confirmation message further includes an index for a last message received by the first node from the second node, wherein the second node records an index for messages that it has previously sent to the first node and an index for messages that have been confirmed by the first node for comparison to the indexes for last messages received included in the confirmation messages to detect out of sequence confirmations or missing messages, and wherein, upon detecting an out of sequence confirmation or a missing message, the second node is configured to assert that the first node has violated the ledger protocol.

8. The system as recited in claim 1, wherein the ledger information includes one or more of transactions submitted by clients of the distributed ledger, blocks of transactions proposed by proposers in the distributed ledger, or messages used by a consensus protocol of the distributed ledger to reach agreement among the plurality of nodes on successive next blocks in the distributed ledger.

9. A method, comprising:

performing, by a first node of a plurality of nodes of a distributed ledger system individually comprising at least one processor and a memory:

receiving, from a second node of the plurality of nodes, one or more messages to execute at least one transaction on an account of a distributed ledger according to a ledger protocol;

concatenating a particular message of the one or more sent messages and a hash computed from at least one previously sent message to generate concatenated data, wherein the particular message and the at least one previously sent message individually comprise communications from the second node to the first node;

computing a particular value comprising a hash of the concatenated data;

executing the at least one transaction on the account of the distributed ledger according to the ledger protocol;

returning, to the second node, a confirmation message for the one or more sent messages comprising the particular value and an index for a last message received by the first node from the second node;

recording respective indexes for messages previously sent from the first node to the second node and the index for the last message received by the first node from the second node;

comparing the index for the last message received to the recorded indexes to detect out of sequence confirmations or missing messages; and upon detecting a skipped message, an out of sequence message, or a conflicting message, asserting that the second node has violated the ledger protocol; and performing, by the second node comprising at least one processor and a memory:

computing a value based on a plurality of messages and a sequence in which the plurality of messages were received; and comparing the computed value to the particular value included in the confirmation message to determine whether the first node has or has not correctly executed the at least one transaction on the account of the distributed ledger according to the ledger protocol.

10. The method as recited in claim 9, further comprising:

receiving, by the second node, one or more additional messages from the first node according to the ledger protocol;

computing, by the second node, an additional value based on the one or more additional messages and at least one previously received message; and returning an additional confirmation message for the one or more additional messages to the first node, the additional confirmation message including the computed additional value, wherein the computed additional value indicates to the first node whether the second node has or has not received a correct sequence of messages.

11. The method as recited in claim 10, wherein the method further comprises:

including, by the first node, a highest index of messages for which the first node has received confirmation from the second node in each message sent to the second node;

comparing, by the second node, a highest index for messages that it has confirmed to the first node to the highest indexes received in the messages from the first node to detect out of sequence acknowledgements or invalid acknowledgements; and upon detecting an out of sequence acknowledgement or an invalid acknowledgement, asserting, by the second node, that the first node has violated the ledger protocol.

12. The method as recited in claim 10, wherein the method further comprises:

including, by the first node, an index for a last message sent to the second node in each message sent to the second node;

comparing, by the second node, an index for messages that it has previously received from the first node to the indexes for last messages received in the messages from the first node to detect skipped messages, out of sequence messages, or conflicting messages; and upon detecting a skipped message, an out of sequence message, or a conflicting message, asserting, by the second node, that the first node has violated the ledger protocol.

13. The method as recited in claim 10, further comprising including, by the second node, a summary of its local data in the confirmation message, wherein the summary indicates to the first node whether the second node has or has not processed all messages received.

14. A non-transitory, computer-readable storage medium storing program instructions that when executed on a plurality of computers cause the plurality of computers to:

participate as individual nodes of a plurality of nodes in a distributed ledger, wherein individual nodes of the plurality of nodes locally store and maintain a copy of a ledger and wherein individual nodes of the plurality of nodes are configured to:

send messages including ledger information to others of the plurality of nodes via respective ones of a plurality of channels over a network according to a ledger protocol; and receive messages including ledger information from the others of the plurality of nodes via other respective ones of the plurality of channels over the network according to the ledger protocol;

wherein to communicate over a particular channel of the plurality of channels with a second node of the plurality of nodes, the first node of the plurality of nodes is configured to:

receive, from the second node of the plurality of nodes, one or more messages to execute at least one transaction on an account of the distributed ledger according to a ledger protocol;

concatenate a particular message of the one or more sent messages and a hash computed from at least one previously sent message to generate concatenated data, wherein the particular message and the at least one previously sent message individually comprise communications from the second node to the first node;

compute a particular value comprising a hash of the concatenated data;

execute the at least one transaction on the account of the distributed ledger according to the ledger protocol;

return a confirmation message for the one or more sent messages, the confirmation message sent to the second node, wherein the confirmation message comprises the particular value and an index for a last message received by the first node from the second node;

record respective indexes for messages previously sent from the first node to the second node and the index for the last message received by the first node from the second node;

compare the index for the last message received to the recorded indexes to detect out of sequence confirmations or missing messages; and upon detecting a skipped message, an out of sequence message, or a conflicting message, assert that the second node has violated the ledger protocol; and wherein the second node is configured to:

compute a value based on a plurality of messages and a sequence in which the plurality of messages were received; and compare the computed value to the particular value included in the confirmation message to determine whether the first node has or has not correctly executed the at least one transaction on the account of the distributed ledger according to the ledger protocol.

15. The non-transitory, computer-readable storage medium of claim 14, wherein the first node is further configured to:

receive one or more messages from a different node of the plurality of nodes;

compute a value based on the one or more received messages and at least one previously received message; and return a confirmation message for the one or more received messages to the different node, the confirmation message including the computed value;

wherein the computed value indicates to the different node whether the second node has or has not received a correct sequence of messages.

16. The non-transitory, computer-readable storage medium of claim 15, wherein each message received from the first node includes a highest index of messages for which the first node has received confirmation from the second node and an index for a last message sent to the second node in each message sent to the second node, wherein the second node is further configured to:

compare a highest index for messages that it has confirmed to the first node to the highest indexes received in the messages from the first node to detect out of sequence acknowledgements or invalid acknowledgements;

compare an index for messages that it has previously received from the first node to the indexes for last messages received in the messages from the first node to detect skipped messages, out of sequence messages, or conflicting messages; and upon detecting an out of sequence acknowledgement, an invalid acknowledgement, a skipped message, an out of sequence message, or a conflicting message, assert that the first node has violated the ledger protocol.

* * * * *